United States Patent [19]
Stevens

[11] 3,877,168
[45] Apr. 15, 1975

[54] FISH LURE

[76] Inventor: Milton J. Stevens, 3454 Ocean View Blvd., Glendale, Calif. 91208

[22] Filed: July 26, 1974

[21] Appl. No.: 492,220

[52] U.S. Cl. ............. 43/42.31; 43/42.34; 43/42.36; 43/42.39; 43/42.47
[51] Int. Cl............................................. A01k 85/00
[58] Field of Search............ 43/42.31, 42.34, 42.36, 43/42.47

[56] References Cited
UNITED STATES PATENTS

| | | | |
|---|---|---|---|
| 1,927,441 | 9/1933 | Korte | 43/42.47 |
| 2,437,549 | 3/1948 | Pecher | 43/42.36 |
| 3,091,049 | 5/1963 | Reimers | 43/42.31 |
| 3,269,047 | 8/1966 | Slattery | 43/7 |
| 3,802,115 | 4/1974 | Auten et al. | 43/42.31 |

*Primary Examiner*—Louis G. Mancene
*Assistant Examiner*—Daniel J. Leach

[57] ABSTRACT

A fish lure formed of a light buoyant, fish-shaped body with a forwardly protruding metal bill that has its inward end molded into the body, a sound-generating device cemented to said inward end of the bill, the sound that is produced thereby being in the form of a fish-exciting rattle, the magnitude of which is heightened by resonance of the bill during casting, trolling or otherwise causing the lure to move in response to the angler's manipulations. The strength of the lure is enhanced by embodying a line- and hook-connecting member into said body, said member having a fishline-connecting eye, and one or more hook-connecting eyes and being formed to transmit the pull on the eye to which the fishline is attached directly to the other eyes, thereby keeping the body free of destructive strains. Simulated eyes in the opposite sides of the body have encapsulated bobbing pupils to render visual realism to the lure, the same combining with the mentioned sound-generating device to obtain variable fish-attracting sounds, and particularly simulating the sound made by feeding shrimp which are attractive morsels of hungry bass.

7 Claims, 5 Drawing Figures

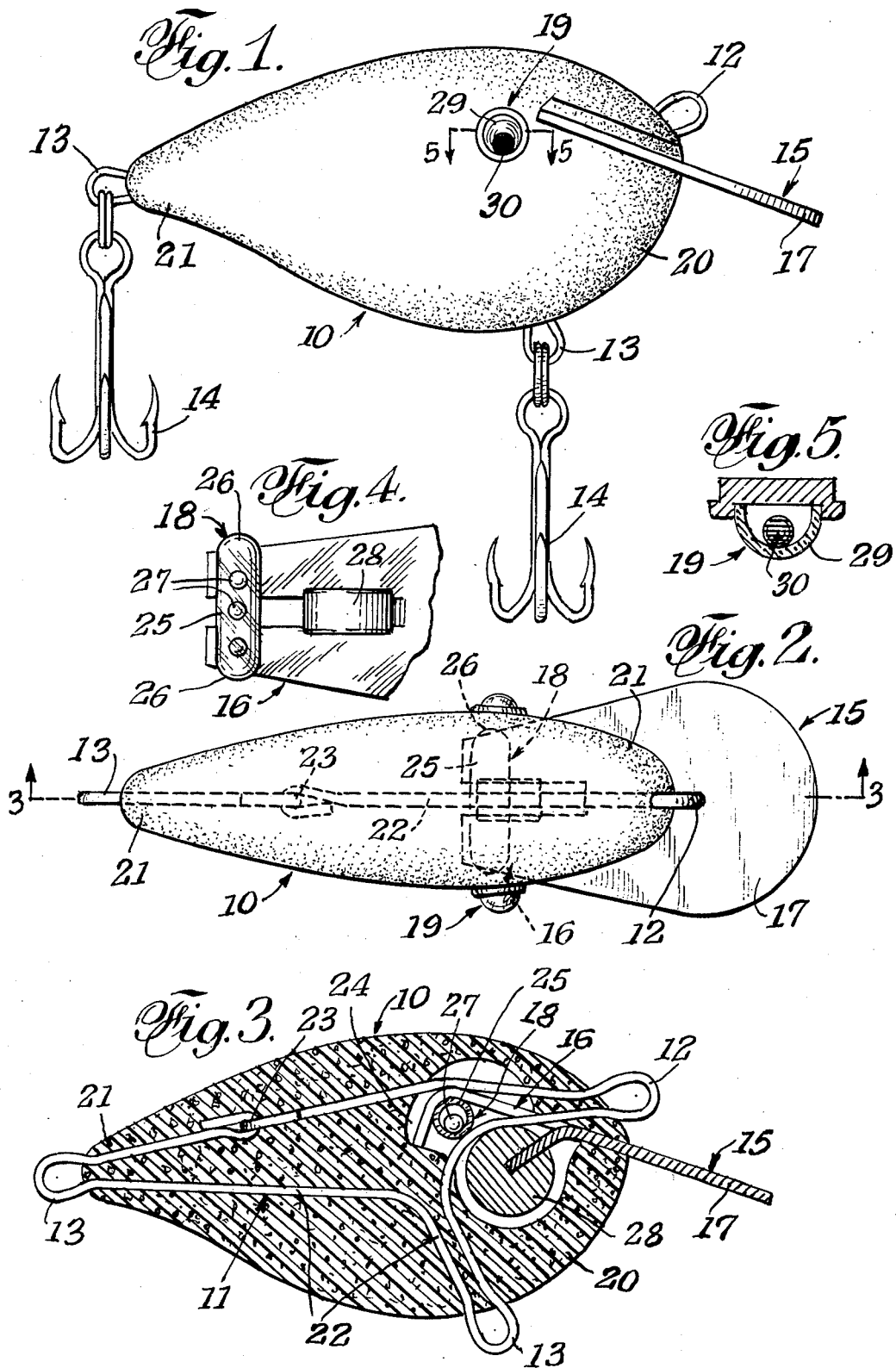

3,877,168

FISH LURE

BACKGROUND OF THE INVENTION

1. Field of the Invention

Artificial luring of game fish, more particularly, bass.

2. Prior Art

Fish-like lures are generally known and ordinarily are made of lightweight material, such as balsa wood, and have short life, particularly when used in turbulent and rock-strewn water. Moreover, such earlier lures are silent and, although physically resembling a particular prey, do not have the excited attention of a game fish such as will serve to impart decoy properties thereto.

SUMMARY OF THE INVENTION

A fish lure is provided comprising a buoyant molded fish-resembling body of beaded expandable polystyrene containing a blowing agent, in most cases, pentane gas, a volatile hydrocarbon, the outer surface of which is coated with a tough acrylic nick-and-scratch resistant finish, a thin metal bill embedded in the forward end of the body to serve as a means for resonating rattle-type noises produced by a device affixed to said resonating means, and a unitary member embedded in said body and formed to have a fishline-attaching line eye that protrudes from the forward end of the body above the bill, and one or more fishhook-attaching line eyes that protrude from the tail and forward under portion of the body. To impart increased life-like realism to the lure encapsulated eyeball-simulating corneas or pupils are embedded in the opposite sides of the body.

The applicant, who has been manufacturing fishing tackle and allied goods for a period in excess of 30 years, has no knowledge of any artificial lures, other than those fabricated of balsa wood, that had lightness, buoyancy and resistance to damage as is obtained by the above-mentioned molded body.

It is an object of the invention to provide a strong, light-weight and damage-resistant fish lure that embodies the above and hereinafter described structural features whereby the same serves to decoy the prey being sought by both sound and sight.

This invention also has for its objects to provide such means that are positive in operation, convenient in use, easily installed in working position and easily disconnected therefrom, economical to manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following specification merely describes one embodiment of the present invention, which is given by way of illustration or example only.

In the drawing, like reference characters designate similar parts in the several views.

BRIEF DESCRIPTION OF THE DRAWING

FIG. 1 is a side elevational view of a fish lure according to the present invention.

FIG. 2 is a top plan view thereof.

FIG. 3 is a sectional view as taken on the line 3—3 of FIG. 2.

FIG. 4 is a bottom plan view of the inner portion of the sound-producing portion of the bill.

FIG. 5 is an enlarged sectional view as taken on the line 5—5 of FIG. 1.

DESCRIPTION OF THE PREFERRED EMBODIMENT

The present fish lure comprises generally a body 10, a member 11 encapsulated in said body and formed to have a loop or eye 12 for connection to the line of a fishing rod, and one or more eyes 13 for attachment to fishhooks 14; a member 15 simulating a bill and having its rearward end 16 embedded in said body and its flat portion 17 extending forwardly from the forward end of the body 10; sound-producing means 18 carried by said rearward end 16 of the member 15; and two eye-eliminating means 19 embedded, one on each side of the body 10, to impart, together with the bill 15, an appearance serving as a decoy to visually lure prey, such as bass, trout or other such game fish.

It will be seen from FIGS. 1 and 3 that the portion 17 of the bill or tongue member has a downwardly forward slope which may be changed by upward or downward bending to regulate the path of movement of the lure under pull of the fishing line. Further, by weighting said bill portion 17 with grains of metal or the like, the buoyancy of the lure may be regulated to control the depth at which the same runs in water. Such added weight, combined with the rate or speed of the retrieve, under control of the fishing line, can allow the angler to raise or lower the depth of the lure during trolling. Further, when no retrieve is made, the lure will rise to the surface and serve as a float.

The body 10 is preferably formed to simulate that of the fish being lured, the same accordingly, having a forward body end 20 and a rearward tapered tail end 21. Said body is preferably molded to have a unitary mass comprising expanded cellular polystyrene formed of beaded expandable polystyrene containing a blowing agent as pentane gas, a volatile hydrocarbon, to impart a high degree of buoyancy to the body.

To impart strength and resistance to wear and breakage, the above-described molded body is coated with an epoxy plastic resin, preferably by dipping the body in said plastic resin, while the same is in its uncured viscous liquid state.

To lend further visual realism to the lure body 10, before the epoxy resin is applied, the body, at selected portions thereof, may be airbrushed or the like, have trim color applied to selected surface portions thereof. Since, when cured, epoxy resins set to a hard and transparent wear resistant and moisture impervious consistancy, the trim colors on the body are sealed in. As above produced, the body retains the buoyancy of the polystyrene while benefitting by the hardness and strength of the expoxy resin coating.

The member 11 is preferably formed of wire that, except for the eyes 12 and 13 thereof, has a body portion 22 that is entirely enclosed within the lure body 10. The same, as shown, is preferably formed of a single length of wire, the ends of which are hooked together as at 23. As can be seen in FIG. 3 and recognizing the pulls on the eyes 13 by a fishing line connected to the eye 12 of member 11, it will be clear that the strains thus produced are not transmitted to the body, the hard surface of which retains its shape irrespective of the above diversely directed pulls on the member 11.

The member 15 is preferably formed of thin anodized metal to be non-corrosive. The rearward end 16 of said member extends into a cavity 24 of the body 10, as seen in FIG. 3, the sound-producing means 18 being cemented or otherwise secured to the innermost portion of the end 16 of the bill-simulating member 15. As shown in FIGS. 3 and 4, the sound-producing means 18 comprises a hollow and preferably cylindrical container 25 of a sound-producing material such as glass, said container having closed ends 26 to loosely confine a plurality of hard, preferably metallic balls 27 which, during movement of the lure under pull on the fishing line attached to the eye 12 of the member 11, in various directions both upwardly and laterally, move into contact with each other and with the wall of the container 25, thereby causing vibration of the bill 15 which is transmitted to the water in which the lure is being "played."

As shown in FIGS. 3 and 4, an anchor element 28 is attached to the bill portion 16 to retain the bill rigidly secured to the lure body 10.

The simulated eyes 19 are embedded in the opposite sides of the body 10, the same not only rendering visual realism to the lure but also providing means for producing supplemental sounds which, together with the metallic sounds that are produced by the means 18, create sound variations which, in combination with the visual aspects of the lure, attract the attention of the prey.

To this end each eye 19 comprises a transparent enclosure 29 that is preferably formed as a dome in which is housed a ball 30 that bobs around the enclosure 29 striking the same to produce sounds as the lure is moved around, as before mentioned.

The above-described eye devices, due to the non-metallic balls 30, produce a lower decibel of sound than do the steel balls of the device 18. This mixing of the clattering noises of device 18, as amplified by the resonation of the bill portion 17, and the lower, less metallic sounds of the bobbing eye pupils, create a sound that is attractive to fish of the bass family because the same simulates the sounds produced by feeding shrimp, a food source of bass, i.e., any of various edible perch-like fresh or salt water fishes.

While the foregoing has illustrated and described what is now contemplated to be the best mode of carrying out the invention, the construction is, of course, subject to modification without departing from the spirit and scope of the invention.

Having thus described the invention, what is claimed and desired to be secured by letters patent is:

1. A fish lure comprising:

A buoyant, generally solid polystyrene body;

sound producing means disposed within the body;

a relatively thin metallic member having one end affixed to the body and its opposite end extending forwardly therefrom; and two eye-simulating means embedded, one on each side of the body, each of said means comprising a transparent domed enclosure, and a loose ball enclosed in each respective enclosure and adapted to strike the interior surfaces of the dome to produce sounds during fishing-line controlled movements of the lure.

2. A fish lure according to claim 1 provided with:

additional sound-producing means fixedly carried by the end of the metallic member that is affixed to the body, said latter sound-producing means comprising an enclosure containing a plurality of freely movable balls that strike the interior of the mentioned container and each other during the mentioned fishing-line controlled movements of the lure;

the forwardly extending portion of the metallic member vibrating and resonating in response to the sounds produced by the sound-producing means.

3. A fish lure according to claim 2 in which:

a pull-transmitting member is encapsulated in the body and formed to have a plurality of eyes extending from various portions of the body, one of said eyes extending forwardly and adapted to connect to a fishing line, and at least one additional eye extending from the body in another direction for attachment thereto of a fishhook.

4. A fish lure according to claim 1 in which the polystyrene body is molded as a unitary porous mass of beaded expandable polystyrene containing a volatile hydrocarbon blowing agent.

5. A fish lure according to claim 4 in which the blowing agent comprises pentane gas.

6. A fish lure according to claim 4 in which the polystyrene body is coated with an epoxy plastic resin.

7. A fish lure according to claim 2 in which the volume of sound of the first-mentioned sound-producing means is greater than the volume of sound of the second-mentioned sound-producing means.

* * * * *